(12) United States Patent
Baldwin et al.

(10) Patent No.: US 6,201,787 B1
(45) Date of Patent: Mar. 13, 2001

(54) AUTOMATIC LOOP SEGMENT FAILURE ISOLATION

(75) Inventors: David Baldwin, Irvine; David Brewer, Anaheim, both of CA (US)

(73) Assignee: Emulex Corporation, Costa Mesa, CA (US)

( * ) Notice: Subject to any disclaimer, the term of this patent is extended or adjusted under 35 U.S.C. 154(b) by 0 days.

(21) Appl. No.: 09/398,520

(22) Filed: Sep. 15, 1999

Related U.S. Application Data

(62) Division of application No. 09/071,288, filed on May 1, 1998, now Pat. No. 6,101,166.

(51) Int. Cl.[7] ............... G01R 31/08; H04J 3/14
(52) U.S. Cl. ............ 370/222; 370/225; 370/245; 370/463; 370/522; 370/401; 714/4
(58) Field of Search .................... 370/401, 403, 370/216, 217, 221, 229, 463, 911, 220, 222–228, 906, 907, 453, 457, 522, 242, 243, 245, 248, 249; 709/239, 249, 250, 251, 224; 359/115, 117, 118, 119; 340/825, 825.01, 825.06; 714/2, 4, 25, 47, 715, 716, 717, 712

(56) References Cited

U.S. PATENT DOCUMENTS

| | | | |
|---|---|---|---|
| 4,956,836 | * 9/1990 | Boatwright | 370/222 |
| 5,436,624 | * 7/1995 | Pearce | 370/216 |
| 5,495,580 | 2/1996 | Osman | 709/246 |
| 5,522,047 | 5/1996 | Grow et al. | 709/251 |
| 5,535,192 | * 7/1996 | Trubey et al. | 370/223 |
| 5,546,378 | * 8/1996 | Wirth et al. | 370/223 |
| 5,581,543 | * 12/1996 | Natarajan | 370/221 |
| 5,625,478 | * 4/1997 | Doerr et al. | 370/223 |
| 5,638,512 | 6/1997 | Osman et al. | 709/251 |
| 5,638,518 | * 6/1997 | Malladi | 709/251 |
| 5,659,718 | 8/1997 | Osman et al. | 710/129 |
| 5,740,158 | * 4/1998 | Aoki et al. | 370/224 |
| 5,751,715 | * 5/1998 | Chan et al. | 370/455 |
| 5,812,754 | * 9/1998 | Lui et al. | 714/6 |

OTHER PUBLICATIONS

Fiber Channel Tutorial, http://www.fibrechannel.com/technology/tutorial.htm.
Fibre Channel Overview, http://www.cern.ch/HSI/fcs/spec/overview.htm.
Fibre Channel Glossary, http://www.iol.unh.edu/training/fc/fcglossary.html.

* cited by examiner

Primary Examiner—Seema S. Rao
(74) Attorney, Agent, or Firm—Fish & Richardson P.C.

(57) ABSTRACT

A hub port in a hub of a loop network which automatically bypasses a node port which is generating a particular loop failure initialization sequence. The hub port contains a detection circuit which enables the hub port to detect loop failure initialization data received from its attached node port. Upon detecting such data from an attached node port, the hub port replaces such data with buffer data to be passed to the next hub port. Upon detecting the completion of a loop failure initialization sequence from an attached node port, the hub port enters a bypass mode. The hub port no longer passes on output from its attached node port and instead forwards along the internal hub link data received from the previous hub port in the hub loop. The bypass is maintained until the hub port receives a primitive sequence indicating the recovery of the attached node port. The hub port periodically sends at least one recovery sequence to the node port. When the hub port receives the same recovery sequence back from the node port, the hub port ends the bypass and reinserts the node port back into the hub loop.

9 Claims, 3 Drawing Sheets

AUTOMATIC LOOP SEGMENT FAILURE ISOLATION

This is a divisional of U.S. application Ser. No. 09/071,288, filed May 1, 1998 now U.S. Pat. No. 6,101,166, issued Aug. 8, 2000.

TECHNICAL FIELD

The present invention relates to electronic network communications systems, and more specifically to automatic isolation of a node or loop segment in a loop network where a data channel transmitting data from a hub port to the node or loop segment has failed.

BACKGROUND INFORMATION

Electronic data systems are frequently interconnected using network communication systems. Area-wide networks and channels are two approaches that have been developed for computer network architectures. Traditional networks (e.g., LAN's and WAN's) offer a great deal of flexibility and relatively large distance capabilities. Channels, such as the Enterprise System Connection (ESCON) and the Small Computer System Interface (SCSI), have been developed for high performance and reliability. Channels typically use dedicated short-distance connections between computers or between computers and peripherals.

Features of both channels and networks have been incorporated into a new network standard known as "Fibre Channel". Fibre Channel systems combine the speed and reliability of channels with the flexibility and connectivity of networks. Fibre Channel products currently can run at very high data rates, such as 266 Mbps or 1062 Mbps. These speeds are sufficient to handle quite demanding applications, such as uncompressed, fill motion, high-quality video. ANSI specifications, such as X3.230-1994, define the Fibre Channel network. This specification distributes Fibre Channel functions among five layers. The five functional layers of the Fibre Channel are: FC—0—the physical media layer; FC—1—the coding and encoding layer; FC—2—the actual transport mechanism, including the framing protocol and flow control between nodes; FC—3—the common services layer; and FC—4—the upper layer protocol.

There are generally three ways to deploy a Fibre Channel network: simple point-to-point connections; arbitrated loops; and switched fabrics. The simplest topology is the point-to-point configuration, which simply connects any two Fibre Channel systems directly. Arbitrated loops are Fibre Channel ring connections that provide shared access to bandwidth via arbitration. Switched Fibre Channel networks, called "fabrics", are a form of cross-point switching.

Conventional Fibre Channel Arbitrated Loop ("FC-AL") protocols provide for loop functionality in the interconnection of devices or loop segments through node ports. However, direct interconnection of node ports is problematic in that a failure at one node port in a loop typically causes the failure of the entire loop. This difficulty is overcome in conventional Fibre Channel technology through the use of hubs. Hubs include a number of hub ports interconnected in a loop topology. Node ports are connected to hub ports, forming a star topology with the hub at the center. Hub ports which are not connected to node ports or which are connected to failed node ports are bypassed. In this way, the loop is maintained despite removal or failure of node ports.

More particularly, an FC-AL network is typically composed of two or more node ports linked together in a loop configuration forming a single data path. Such a configuration is shown in FIG. 1A. In FIG. 1A, six node ports 102, 104, 106, 108, 110, 112 are linked together by data channels 114, 116, 118, 120, 122, 124. In this way, a loop is created with a datapath from node port 102 to node port 104 through data channel 114 then from node port 104 to node port 106 through data channel 116, and so on to node port 102 through data channel 124.

When there is a failure at any point in the loop, the loop datapath is broken and all communication on the loop halts. FIG. 1B shows an example of a failure in the loop illustrated in FIG. 1 A. Data channel 116 connecting node port 104 to node port 106 has a failure 125 before entering node port 106. The failure 125 could be caused by a problem such as a physical break in the wire or electromagnetic interference causing significant data corruption or loss at that point. Node port 106 no longer receives data or valid data from node port 104 across data channel 116. At this point, loop 100 has been broken. Data no longer flows in a circular path and the node ports are no longer connected to one another. For example, node port 104 cannot transmit data to node port 108 because data from node port 104 does not pass node port 106. The loop has, in effect, become a unidirectional linked list of node ports.

In a conventional FC-AL system, recovery proceeds according to a standard. When node port 106 detects that it is no longer receiving valid data across data channel 116, node port 106 begins to generate loop initialization primitive ("LIP") ordered sets, typically LIP (F8, AL_PS) or LIP (F8, F7) ("LIP F8") ordered sets. "AL_PS" is the arbitrated loop address of the node port which is issuing the LIP F8 ordered sets, in this case, node port 106. The LIP F8 ordered sets propagate around the loop. Each node receiving a LIP F8 primitive sequence stops generating data or other signals and sends a minimum of 12 LIP F8 ordered sets. A sequence of three consecutive LIP F8 ordered sets forms a LIP F8 primitive sequence. At this point, the LIP F8 primitive sequences and ordered sets composing primitive sequences propagate through the broken loop 100 shown in FIG. 1B. Loop 100 typically does not function again until the data channel 116 has been repaired or replaced, such as by physical replacement or bypass by a second wire or cable. When node port 106 receives the LIP F8 primitive sequence, node port 106 begins loop initialization.

A conventional partial solution to recovery from a broken node port-to-node port loop is provided by the introduction of a hub within a loop. A hub creates a physical configuration of node ports in a star pattern, but the virtual operation of the node ports continues in a loop pattern. The connection process (ie., sending data between node ports) and interaction with the hubs is effectively transparent to the node ports connected to the hub which perceive the relationship as a standard FC-AL configuration.

FIG. 2A illustrates an arbitrated loop 200 with a centrally connected hub. Similar to loop 100 illustrated in FIG. 1A and 1B, loop 200 includes six node ports 202, 204, 206, 208, 210, 212, each attached to a hub 214. Hub 214 includes six hub ports 216, 218, 220, 222, 224, 226 where each hub port is connected to another hub port in a loop topology by a sequence of internal hub links. In this way, node ports 202–212 are each connected to a corresponding hub port 216–226. Thus, node ports 202–212 operate as though connected in a loop fashion as illustrated in FIG. 1A.

When a failure occurs on a data channel carrying data from a node port to a hub port, the loop is maintained by bypassing the failed node port. In a conventional hub, when a hub port no longer receives data from a node port, the hub port goes into a bypass mode where, rather than passing data received on the data channel from the node port, the hub port passes data received along the internal hub link from the previous hub port. For example, data channel 234 connecting node port 206 to hub port 220 may fail, such as through physical disconnection or interference such that valid data no longer passes from node port 206 to hub port 220. Hub port 220 detects the cessation of valid data from node port 206 and enters bypass mode. In this way, the loop integrity is maintained. Rather than breaking the loop, as was the case illustrated in FIG. 1B, the bypass mode of a hub port allows the loop to be preserved. As shown in FIG. 2A, data continues to flow around the loop even while data channel 234 has failed because hub port 220 is operating in a bypass mode and isolates node port 206.

FIG. 2B illustrates a different problem which is unresolved by conventional hub technology. In FIG. 2B, a data channel 236 carrying data from hub port 220 to node port 206 has failed. In this case, hub port 220 continues to receive data from node port 206 along data channel 234. Because node port 206 is no longer receiving data from the loop, node port 206 under conventional FC-AL protocols typically detects the link failure and begins to generate LIP F8 ordered sets. The hub ports of a conventional hub 214 cannot differentiate the type of signal being received from an attached node port. As a result, in the situation illustrated in FIG. 2B, hub port 220 does not recognize the LIP F8 sequence being received from node port 206 as anything different from the standard data received from node port 206. Thus, hub port 220 does not enter a bypass mode, and sends the data from node port 206 to hub port 222. As the LIP F8 ordered sets continue to be sent by node port 206, they form a LIP F8 primitive sequence, as described above. When the other node ports in the loop receive the LIP F8 primitive sequence, those nodes cease ordinary data processing and transmission and begin to generate LIP F8 ordered sets. At this point, while the virtual nature of the loop could be maintained through a bypass of the failed node port, because a conventional hub port such as hub port 220 does not recognize the LIP F8 nature of the data being sent from the connected node port 206, a situation similar to that illustrated in FIG. 1B results. LIP F8 ordered sets propagate around the loop until all node ports are attempting loop initialization. In a modification of the FC-AL protocols, referred to as "FC-AL-2", in response to receiving LIP F8 primitive sequences, some node ports send LIP F7 primitive sequences once every two seconds.

The inventors have determined that it would be desirable to provide a hub port that can create an automatic bypass upon detection of a LIP F8 primitive sequence from an attached node port and reinsert the node port when the node port has recovered.

SUMMARY

The preferred embodiment of the invention provides a hub port in a hub of a loop network which automatically bypasses a node port which is generating a particular loop failure initialization sequence. The hub port contains a detection circuit which enables the hub port to detect loop failure initialization data received from its attached node port. Upon detecting such data from an attached node port, the hub port replaces such data with buffer data to be passed to the next hub port. Upon detecting the completion of a loop failure initialization sequence from an attached node port, the hub port enters a bypass mode. The hub port no longer passes on output from its attached node port and instead forwards along the internal hub link data received from the previous hub port in the hub loop.

The bypass is maintained until the hub port receives a primitive sequence indicating the recovery of the attached node port. The hub port periodically sends at least one recovery sequence to the node port. When the hub port receives the same recovery sequence back from the node port, the hub port ends the bypass and reinserts the node port back into the hub loop.

One embodiment provides a hub port in a hub of a Fibre Channel arbitrated loop which automatically bypasses a node port which is generating a LIP F8 primitive sequence. The hub port of the preferred embodiment contains a LIP detection circuit which enables the hub port to detect the generation of LIP F8 ordered sets by its attached node port. Upon receiving a LIP F8 ordered set from an attached node port, a hub port of a preferred embodiment generates fill words to be passed to the next hub port. Upon the completion of a LIP F8 primitive sequence from an attached node port, the hub port of the preferred embodiment enters a bypass mode and no longer passes on output from its attached node port and instead forwards data received along the internal hub link from the previous hub port in the hub loop.

While the node port is bypassed, the hub port periodically sends recovery sequences to the node port, such as a LIP (F0, F0) primitive sequence. When the hub port receives the same recovery sequence back from the node port, the hub port ends the bypass and reinserts the node port back into the hub loop.

DETAILED DESCRIPTION

Figure 1A:
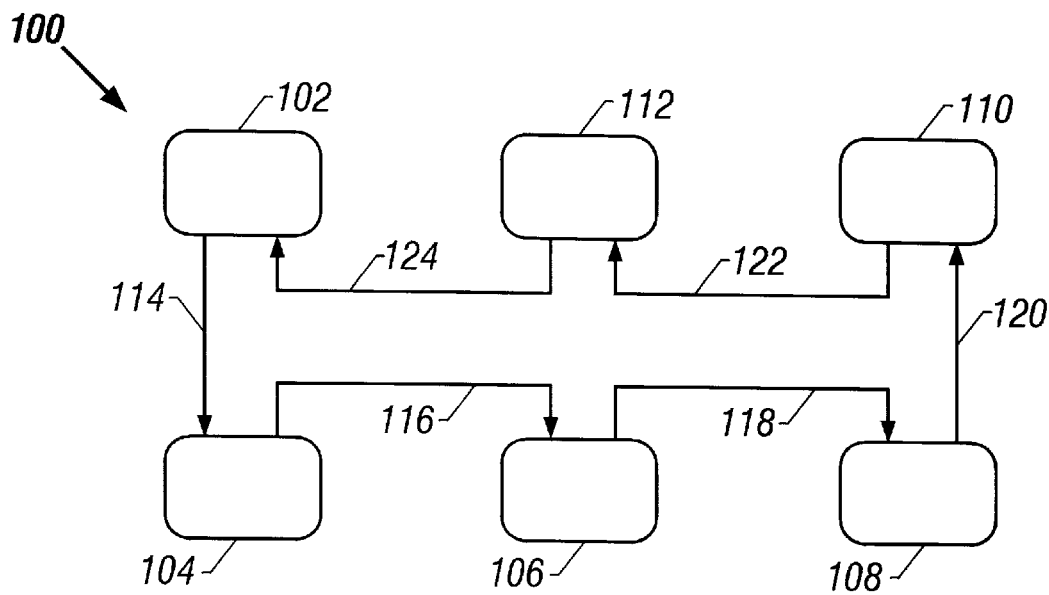
FIG. 1A shows a prior art loop of directly interconnected node ports.
Figure 1B:
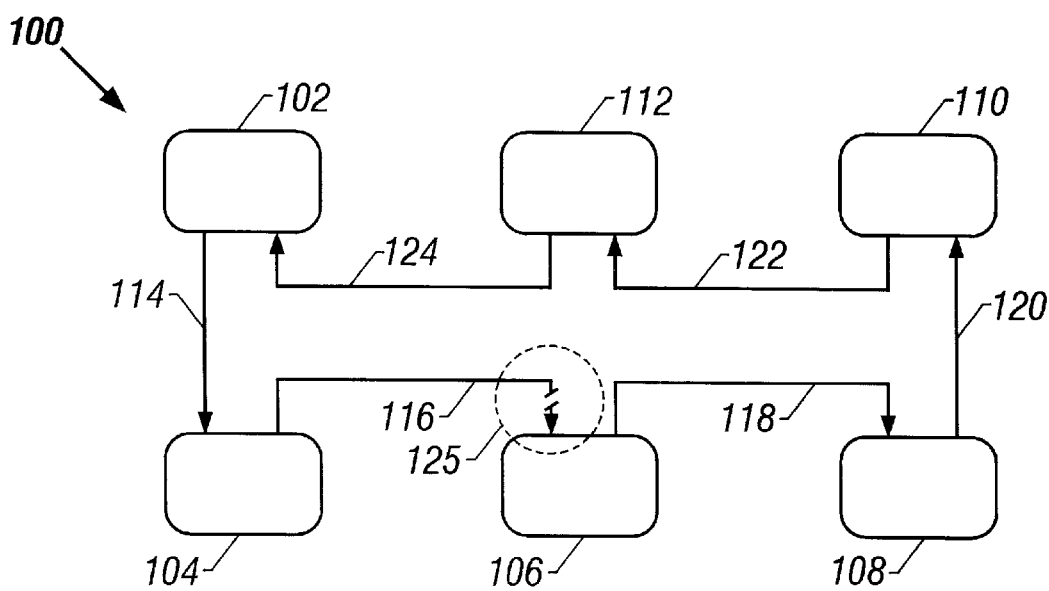
FIG. 1B shows a prior art loop including a failed data channel.

The preferred embodiment provides a mechanism to automatically bypass a node port or loop segment attached to a hub port, where the node port or loop segment is sending loop failure initialization sequences, such as LIP (F8, AL_PS) or LIP (F8, F7) primitive sequences ("LIP F8 primitive sequences"). The invention is explained below in the context of a Fibre Channel Arbitrated Loop ("FC-AL") network as an illustration of the preferred embodiment. However, the invention may have applicability to networks with similar characteristics as FC-AL networks.

If a data channel carrying data to a node port or loop segment from a network hub port develops a link failure, the node port or loop segment is isolated from the hub loop and the other node ports on the hub loop are able to continue communication while the failed node port or loop segment is isolated from the loop.

The preferred embodiment provides a hub port which detects failures in its connection to a node port by detecting loop failure initialization sequences generated by the node port. The hub port then isolates the node port, allowing the remainder of the loop to function with the link error removed, hidden by the bypass mode of the hub port.

When a hub port of the preferred embodiment receives loop failure initialization data from the attached node port, the hub port does not pass the loop failure initialization data along the loop to the next hub port. The hub port instead replaces the loop failure initialization data with buffer data which is sent to the next hub port in the loop. If a loop failure initialization sequence is received (i.e., some specified combination of loop failure initialization data), then the source of the loop failure initialization data (i.e., the node port or loop segment which is generating the loop failure initialization data) is isolated by bypassing the node port.

While the node port is bypassed, the hub port periodically sends at least one recovery sequence to the node port. When the bypass of the node port begins, the hub port preferably switches from transmitting data from the upstream hub port to the node port to transmitting a first programmable primitive (i.e., the value may be set such as by selection external to the hub) to the node port. By not transmitting data from the upstream hub port, interaction between the hub loop and the failed node port is minimized and the bypassed node port is kept non-operational. The hub port transmits the first programmable primitive for a first time period measured by a first timer. When the first time period has elapsed, the hub port switches from transmitting the first programmable primitive to transmitting the recovery sequence. The recovery sequence is preferably a sequence of second programmable primitives which a node port (or nodes within a loop segment represented by a node port) passes on under ordinary operation. Thus, the recovery sequence is passed back from the node port when the node port is operational. The hub port transmits the recovery sequence for a second time period measured by a second timer. If the hub port detects the reception of the recovery sequence from the node port before the expiration of the second time period, the hub port ends the bypass. The hub port reinserts the operational node port back into the hub loop and switches back to transmitting data from the upstream hub port to the node port. If the second time period expires without ending the bypass, the hub port switches back to transmitting the first programmable primitive to the node port and restarts the first timer. This process continues until the bypass ends.

For example, in an FC-AL implementation, when a hub port receives LIP F8 ordered sets from the attached node port, the hub port replaces the LIP F8 ordered set with a "current fill word". If a LIP F8 primitive sequence (e.g., three consecutive identical LIP F8 ordered sets), is received, then the node port or loop segment which is generating the LIP F8 ordered sets is bypassed. The hub port periodically sends at least one recovery sequence of programmable primitives to the node port, such as a LIP (F0, F0) primitive sequence (e.g., three consecutive identical LIP (F0, F0) ordered sets). If the hub port detects the reception of the recovery sequence from the node port before the expiration of the second time period, the hub port ends the bypass. and reinserts the operational node port back into the hub loop.

Fill words are used under conventional FC-AL protocols as buffers between data frames. Data received from a node port is typically temporarily stored in a buffer within the hub port. The data typically leaves the buffer in a first in, first out manner ("FIFO"). The data rate of output from the hub port is not necessarily the same as the data rate of input from the node port. As a result, the data in the buffer may "run dry" if the data rate of the node port is slower than the data rate of the hub port. Conventional FC-AL protocols solve this problem by supplying inter-frame fill words when the data in the buffer supplied from the node port is low. Thus, fill words are used to maintain continuity of the data stream along the loop. Typically a sequence of six fill words is used between frames. However, hub ports and node ports may add or delete from the number of fill words present to maintain data integrity as determined by the FC-AL protocols. A continuous stream of data alone is improper under FC-AL protocols. The "current fill word" is a fill word defined by FC-AL protocols, and may vary depending upon loop traffic. Accordingly, the generation of fill words by the hub port which is receiving LIP F8 ordered sets from the attached node port is consistent with conventional FC-AL protocols.

Under current FC-AL protocols, a LIP F8 primitive sequence includes three consecutive identical LIP F8 ordered sets. Pursuant to the invention in an FC-AL implementation, the bypass of a node port does not occur until a LIP F8 primitive sequence has been received by the hub port. Upon receiving a first LIP F8 ordered set from an attached node port, the hub port "consumes" that LIP F8 ordered set and instead passes a current fill word to the next hub port. If the hub port receives a second consecutive identical LIP F8 ordered set, the hub port again substitutes the current fill word for transmission to the next hub port. If not, the hub port passes along that properly formatted data and returns to normal operation.

If a third consecutive identical LIP F8 ordered set is received by the hub port from the attached node port, the hub port recognizes that a LIP F8 primitive sequence has been received and that the associated node port has failed. At this point, the hub port enters a bypass mode and passes along data from the previous hub port in the loop to the next hub port. In an alternative embodiment, upon receiving the LIP F8 primitive sequence the hub port, before entering bypass mode, passes a third current fill word to the next hub port in the loop. This bypass is a similar operation to when the hub port is not attached to a node port at all. In that case, the hub port is also in a bypass mode (for example, where a hub containing n hub ports is connected to some number of node ports less than n). Those hub ports which are not attached to node ports are in a bypass mode and relay information from the previous hub port to the next hub port.

Once the hub port enters bypass mode due to the reception of a LIP F8 primitive sequence, the hub port switches from transmitting data from the upstream hub port to the attached node port to transmitting a first programmable primitive, such as IDLE. After a first time period expires, such as approximately 1.9 seconds, the hub port switches from transmitting the first programmable primitive to the node port to transmitting the recovery sequence. The recovery sequence is preferably a LIP (F0, F0) primitive sequence (e.g., three consecutive identical LIP (F0, F0) ordered sets). The hub port preferably transmits at least one recovery sequence to the node port. The second time period is preferably approximately 36 milliseconds which is two maximum AL_TIME's under FC-AL-2 protocols. As described above, if the hub port detects the reception of the recovery sequence from the node port before the expiration of the second time period, the hub port ends the bypass. The hub port reinserts the operational node port back into the hub loop and switches back to transmitting data from the upstream hub port to the node port. The hub port preferably replaces the recovery sequence with current fill words after reinserting the node port to keep the recovery sequence out of the hub loop. If the second time period expires without ending the bypass, the hub port switches back to transmitting the first programmable primitive to the node port and restarts the first timer. This process continues until the bypass ends.

Figure 2A:
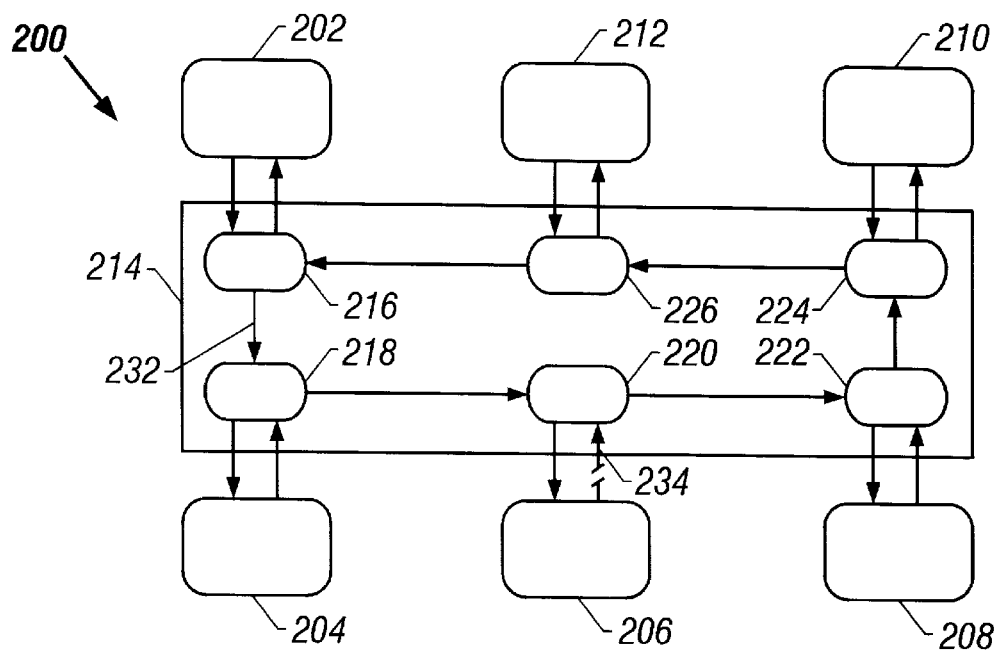
FIG. 2A shows a prior art loop including a hub.
Figure 2B:
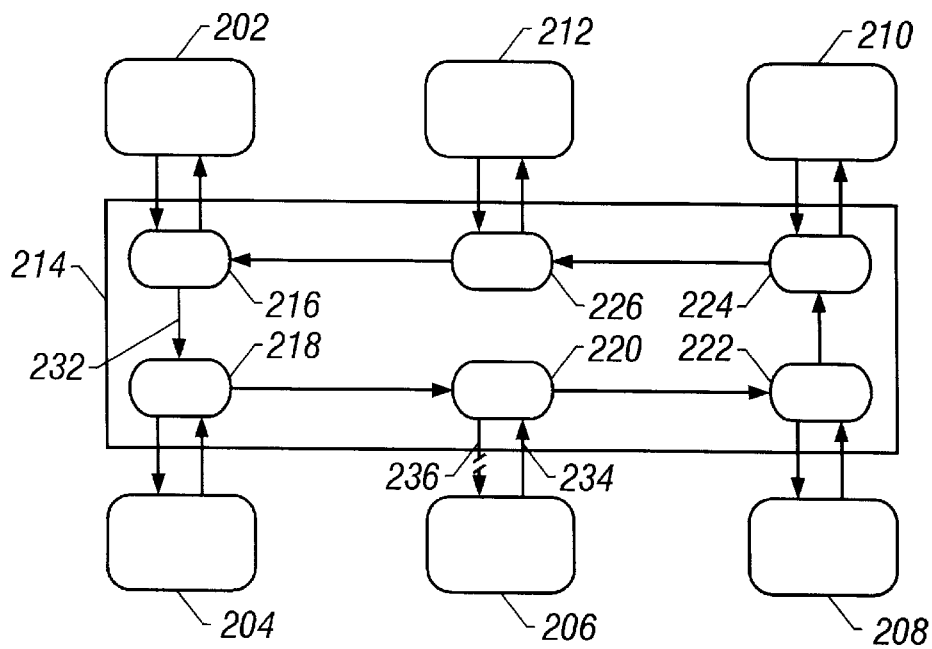
FIG. 2B shows a prior art loop including a hub where a data channel has failed.
Figure 3:
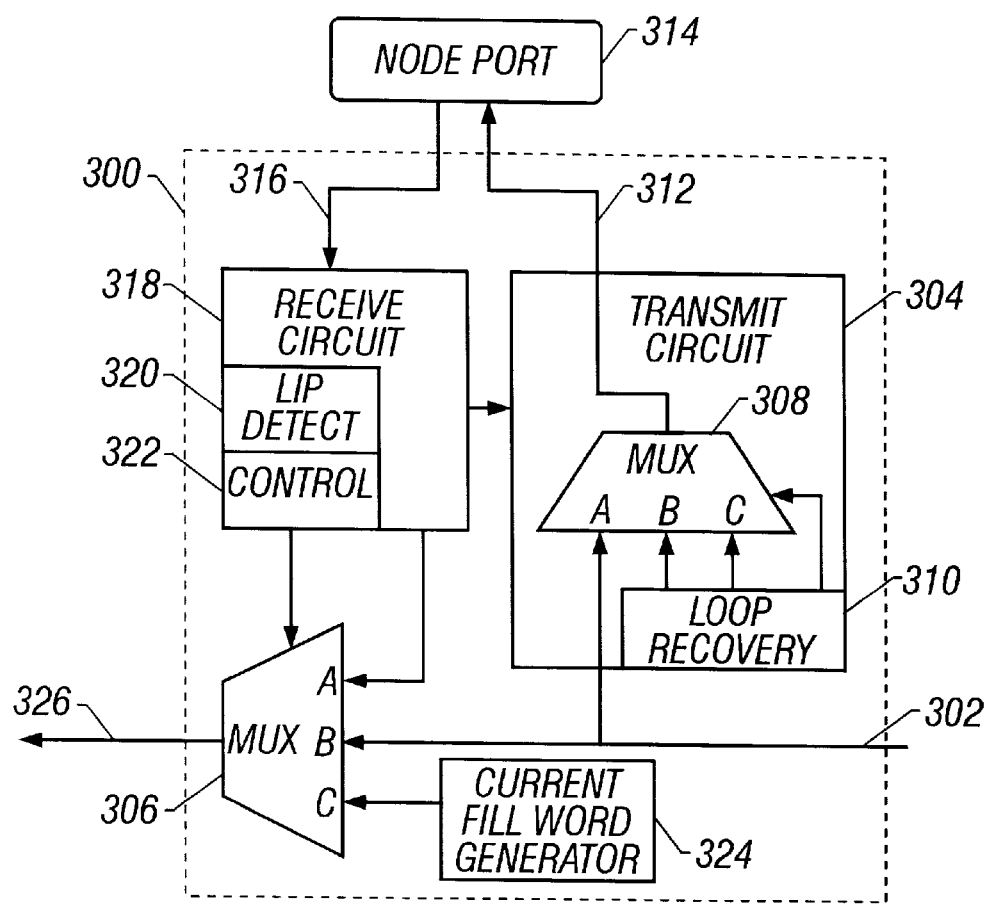
FIG. 3 shows a block diagram of a hub port of the preferred embodiment.

The operation of a hub port in accordance with the preferred embodiment will be explained with reference to the components as illustrated in FIG. 3. Hub port 300 shown in FIG. 3 is used in a manner similar to a conventional hub port shown in FIG. 2A or 2B, such as hub ports 216–226, but has been modified as explained below.

An incoming internal hub link 302 enters hub port 300 and is connected to the output of a previous hub port (not shown). Incoming internal hub link 302 is connected to a hub port transmit circuit 304 and an input B of a switching device, such as a multiplexer 306. Hub port transmit circuit 304 includes another switching device such as a multiplexer 308 and a loop recovery circuit 310. Incoming internal hub link 302 is connected to an input A of multiplexer 308. Loop recovery circuit 310 is connected to inputs B and C of multiplexer 308. Loop recovery circuit 310 supplies a first programmable primitive to input B of multiplexer 308 and a second programmable primitive to input C of multiplexer 308. Loop recovery circuit 310 supplies a control signal to a control input of multiplexer 308 to select the input of multiplexer 308 to connect to the output of multiplexer 308. The output of multiplexer 308 passes through hub port transmit circuit 304 and is connected to a data channel 312. In this way, hub port transmit circuit 304 passes data from multiplexer 308 to a node port 314 through data channel 312 after converting the data to a form usable by node port 314. Node port 314 represents a connection to an operational device or a loop segment.

Node port 314, after performing any processing proper to its functionality and compliant with appropriate network protocols (e.g., FC-AL protocols), transmits data back to hub port 300 through a data channel 316. Data channel 316 connects to a hub port receive circuit 318. Hub port receive circuit 318 converts the data into a form usable in the hub. Hub port receive circuit 318 contains a loop initialization data detect circuit 320 and a hub port output control circuit 322. In an FC-AL implementation, loop initialization data detect circuit 320 is a LIP detect circuit. Hub port receive circuit 318 is also connected to hub port transmit circuit 304. Hub port output control circuit 322 is connected to a control input of multiplexer 306. Hub port receive circuit 318 is connected to an input A of multiplexer 306. Input B of multiplexer 306 is connected to incoming internal hub link 302. A current fill word generator 324 is connected to an input C of multiplexer 306. The output of multiplexer 306 is connected to an outgoing internal hub link 326. Outgoing internal hub link 326 is connected to the input of the next hub port in the hub loop (not shown).

Under ordinary operations, when hub port 300 has an attached node port 314 which is operating properly and in compliance with network protocols such that loop failure initialization sequences are not being generated, hub port output control circuit 322 causes multiplexer 306 to select input A to be output to outgoing internal hub link 326. In this way, the output of node port 314 is passed to outgoing internal hub link 326. Loop recovery circuit 310 causes multiplexer 308 to select input A. In this way, the data on incoming internal hub link 302 is supplied to node port 314.

If no node port 314 is attached to hub port 300, hub port 300 is in a bypass mode. In bypass mode, hub port output control circuit 322 causes multiplexer 306 to select input B to be output on outgoing internal hub link 326. In this way, the data on incoming internal hub link 302 is passed directly to outgoing internal hub link 326 through multiplexer 306.

When loop initialization data detect circuit 320 detects that the data received by hub port receive circuit 318 from node port 314 is loop failure initialization data, loop initialization data detect circuit 320 sends a fill word flag to hub port output control circuit 322. In an FC-AL implementation, loop initialization data detect circuit 320 is a LIP detect circuit, as noted above. When LIP detect circuit 320 detects that the data received by hub port receive circuit 318 from node port 314 is a LIP F8 ordered set, LIP detect circuit 320 sends a fill word flag to hub port output control circuit 322. In response, hub port output control circuit 322 causes multiplexer 306 to select input C and pass a current fill word from current fill word generator 324 to outgoing internal hub link 326. If hub port receive circuit 318 receives a second consecutive identical LIP F8 ordered set, LIP detect circuit 320 keeps the fill word flag set. Hub port output control circuit 322 maintains the selection of input C of multiplexer 306, causing a second current fill word to be sent from current fill word generator 324 to outgoing internal hub link 326. If a second consecutive identical LIP F8 ordered set is not received, LIP detect circuit 320 clears the fill word flag. Hub port output control circuit 322 sets the selection of multiplexer 306 to input A, causing the data received by hub port receive circuit 318 from node port 314 to be output to outgoing internal hub link 326.

If a loop failure initialization sequence is received, loop initialization data detect circuit 320 sets a bypass flag. If the loop failure initialization sequence is not completed, loop initialization data detect circuit 320 clears the fill word flag and hub port output control circuit 322 selects input A of multiplexer 306. In response to the bypass flag, hub port output control circuit 322 changes the input selection of multiplexer 306 to input B. The selection of input B of multiplexer 306 reflects the commencement of bypass mode for hub port 300. In an alternative embodiment, the selection of input B of multiplexer 306 is timed to occur after passing a third current fill word from current fill word generator 324 to outgoing internal hub link 326. In an FC-AL implementation, if a third consecutive identical LIP F8 ordered set is received, LIP detect circuit 320 sets the bypass flag. If a third consecutive identical LIP F8 ordered set is not received, the LIP F8 ordered set received flag is cleared by LIP detect circuit 320 and hub port output control circuit 322 selects input A of multiplexer 306.

Hub port receive circuit 318 also sends the bypass flag to hub port transmit circuit 304. As described above, loop recovery circuit 310 supplies a series of first programmable primitives to input B of multiplexer 308 and a series of second programmable primitives to input C of multiplexer 308. The first programmable primitive is programmable (i.e., the value may be set such as by selection external to the hub) and preferably has a default value which does not cause a node port receiving the first programmable primitive to do anything other than pass on the first programmable primitive. In an FC-AL implementation, the first programmable primitive preferably has a default value of IDLE. The second programmable primitive is programmable and preferably has a default value which is a unique primitive that node ports pass on without modification. In an FC-AL implementation, the second programmable primitive preferably has a default value of LIP (F0, F0). The recovery sequence is a sequence of second programmable primitives, such as a LIP (F0, F0) primitive sequence in an FC-AL implementation. The selection of inputs for multiplexer 308 is controlled by loop recovery circuit 310.

In response to the bypass flag, loop recovery circuit 310 selects input B of multiplexer 308. When loop recovery circuit selects input B of multiplexer 308, loop recovery circuit begins a first timer (not shown). The first timer measures a first time period, which is preferably approximately 1.9 seconds long in an FC-AL implementation. When the first time period expires, loop recovery circuit selects input C of multiplexer 308 and begins a second timer (not shown). The second timer measures a second time period, which is preferably approximately 36 milliseconds long in an FC-AL implementation. A preferred time period in an FC-AL-2 implementation is 36 milliseconds which is two maximum AL_TIME's. When the second time period expires, if the bypass flag is still set, loop recovery circuit 310 selects input B of multiplexer 308 and begins the first timer again. The selection of inputs B and C of multiplexer 308 in coordination with the first and second timers continues until the bypass flag is cleared.

Loop initialization data detect circuit 320 clears the bypass flag upon detecting that hub port 300 has received the recovery sequence. In response, hub port output control circuit 322 sets the input selection of multiplexer 306 to input A, connecting the output of node port 314 to outgoing internal hub link 326. In addition, loop recovery circuit 310 selects input A of multiplexer 308, connecting incoming internal hub link 302 to node port 314. Thus, in an FC-AL implementation, LIP detect circuit 320 preferably clears the bypass flag upon detecting a LIP (F0, F0) primitive sequence. In addition, before selecting input B of multiplexer 306, hub port output control circuit 322 preferably replaces the recovery sequence with current fill words by selecting input C of multiplexer 306 to prevent the from being introduced to the hub loop.

In one FC-AL implementation, the hub port includes a LIP (F7, F7) generator connected to a fourth data input of the multiplexer. The LIP (F7, F7) generator generates LIP (F7, F7) ordered sets. Once the bypass flag has been cleared, the hub port begins loop initialization. The output control circuit selects the fourth data input of the multiplexer so that LIP (F7, F7) ordered sets are output onto the outgoing internal hub link. The hub port continues to output LIP (F7, F7) ordered sets onto the loop until the hub port receive circuit detects a LIP sequence other than a LIP F8 primitive sequence (e.g., three consecutive identical LIP (F7, F7) ordered sets) received from the attached node port.

The automatic bypass of node port 314 upon detecting a loop failure initialization sequence from that node port 314 conceals the occurrence of a data channel failure. The loop operation continues without the complete collapse of loop operation as seen in FIGS. 1A, 1B, 2A, and 2B. By replacing loop failure initialization data, such as the first two LIP F8 ordered sets received, by current fill words, unnecessary and possibly destructive loop failure initialization data is not introduced to the loop. In addition, by reinserting the node port to the hub loop only upon detecting a specific recovery sequence generated by the hub port, only operational node ports (i.e., devices or loop segments) are reinserted into the hub loop, including under FC-AL or FC-AL-2 protocols.

The preferred embodiment has been described along with several alternative embodiments. However, variations which fall within the scope of the following claims are within the scope of the present invention. Accordingly, the present invention is not limited to the embodiment described above but only by the scope of the following claims.

What is claimed is:

1. A hub port in a hub for connecting a node port to the hub, the hub port comprising:
   (a) a first switching device, including a first input, a second input, a third input, and a control input;
   (b) a second switching device, including a first input, a second input, a third input, and a control input;
   (c) a hub data source connected to the first input of the first switching device and to the first input of the second switching device;
   (d) a node data source connected to the second input of the first switching device and to the node port;
   (e) a buffer data generator connected to the third input of the first switching device;
   (f) a loop initialization data detect circuit connected to the node data source and to the control input of the first switching device;
   (g) a first primitive generator connected to the second input of the second switching device;
   (h) a second primitive generator connected to the third input of the second switching device;
   (i) a loop recovery circuit connected to the control input of the second switching device.

2. The hub port of claim 1 where the first primitive generator and the second primitive generator are programmable.

3. The hub port of claim 1 where the hub port is in a Fibre Channel Arbitrated Loop network.

4. The hub port of claim 1 where the buffer data generator generates current fill words according to Fibre Channel Arbitrated Loop protocols.

5. The hub port of claim 1 where the loop initialization data detect circuit is a LIP detect circuit which detects LIP F8 ordered sets and LIP F8 primitive sequences according to Fibre Channel Arbitrated Loop protocols.

6. A hub port in a hub for connecting a node port to the hub, the hub port comprising:
   (a) a first multiplexer including a control input, a first input, a second input, and a third input;
   (b) a hub port transmit circuit connected to the node port, where the hub port transmit circuit includes:
      (1) a second multiplexer including a control input, a first input, a second input, and a third input;
      (2) a loop recovery circuit connected to the second input, the third input, and the control input of the second multiplexer, where the loop recovery circuit supplies a first primitive to the second input of the second multiplexer, and a second primitive to the third input of the second multiplexer;
      (3) a first timer connected to the loop recovery circuit; and
      (4) a second timer connected to the loop recovery circuit;
   (c) an incoming internal hub link connected to the second input of the first multiplexer and to the first input of the second multiplexer;
   (d) a first data channel connected to the hub port transmit circuit, where the first data channel supplies data from the hub port transmit circuit to the node port;
   (e) a hub port receive circuit connected to the hub port transmit circuit and which includes a loop initialization data detect circuit and a hub port output control circuit, where the hub port output control circuit is connected to the control input of the first multiplexer, and the hub port receive circuit is connected to the first input of the first multiplexer and to the hub port transmit circuit;
   (f) a second data channel connected to the hub port receive circuit, where the second data channel supplies data from the node port to the hub port receive circuit;
   (g) a current fill word generator connected to the third input of the first multiplexer; and
   (h) an outgoing internal hub link connected to the first multiplexer.

7. The hub port of claim 6 where the first primitive is programmable and the second primitive is programmable.

8. A hub port for isolating and recovering from loop failures, comprising:
   (a) a first data channel connecting the hub port to the node port;
   (b) a second data channel connecting the node port to the hub port;
   (c) an incoming internal hub link connecting the hub port to an upstream hub port;
   (d) an outgoing internal hub link connecting the hub port to a downstream hub port;
   (e) a loop initialization data detect circuit coupled to the second data channel, said loop initialization data detect circuit configured to isolate loop failures;
   (f) a current fill word generator;
   (g) a loop recovery circuit coupled to the loop initialization detect circuit, the loop recovery circuit connecting the first data channel to one of: the incoming internal hub link or the loop recovery circuit, where said loop recovery circuit operates to generate a recovery sequence to recover from said loop failures; and
   (h) a hub port output control circuit coupled to the loop initialization detect circuit, where the hub port output control circuit connects the outgoing internal hub link to one of: the second data channel, the incoming internal hub link, or the current fill word generator.

9. A hub port for isolating and recovering from loop failures, comprising:
   (a) a first data channel connecting the hub port to the node port;
   (b) a second data channel connecting the node port to the hub port;
   (c) an incoming internal hub link connecting the hub port to an upstream hub port;
   (d) an outgoing internal hub link connecting the hub port to a downstream hub port;
   (e) a loop initialization data detect circuit coupled to the second data channel, said loop initialization data detect circuit configured to isolate loop failures;
   (f) a hub port receive circuit coupled to the second data channel;
   (g) a current fill word generator;
   (h) a loop recovery circuit coupled to the loop initialization detect circuit, the loop recovery circuit connecting the first data channel to one of: the incoming internal hub link or the loop recovery circuit, where said loop recovery circuit operates to generate a recovery sequence to recover from said loop failures; and
   (i) a hub port output control circuit coupled to the loop initialization detect circuit, where the hub port output control circuit connects the outgoing internal hub link to one of: the hub port receive circuit, the incoming internal hub link, or the current fill word generator.

* * * * *